(12) United States Patent
Linthicum et al.

(10) Patent No.: US 11,360,743 B2
(45) Date of Patent: Jun. 14, 2022

(54) DATA SET INCLUDING A SECURE KEY

(71) Applicant: Cyber Reliant Corp., Annapolis, MD (US)

(72) Inventors: Katelynn Marie Linthicum, Annapolis, MD (US); John Michael Suit, Mount Airy, MD (US); Ian Spencer Bartelt Becker, Frederick, MD (US)

(73) Assignee: Cyber Reliant Corp., Annapolis, MD (US)

( * ) Notice: Subject to any disclaimer, the term of this patent is extended or adjusted under 35 U.S.C. 154(b) by 147 days.

(21) Appl. No.: 16/935,140

(22) Filed: Jul. 21, 2020

(65) Prior Publication Data

US 2021/0021411 A1 Jan. 21, 2021

Related U.S. Application Data

(60) Provisional application No. 62/877,236, filed on Jul. 22, 2019, provisional application No. 62/876,720, filed on Jul. 21, 2019.

(51) Int. Cl.
| | | |
|---|---|---|
| G06F 21/00 | (2013.01) | |
| H04L 29/06 | (2006.01) | |
| G06F 7/58 | (2006.01) | |
| G06F 16/23 | (2019.01) | |
| H04L 9/08 | (2006.01) | |
| H04L 9/32 | (2006.01) | |

(52) U.S. Cl.
CPC .......... *G06F 7/588* (2013.01); *G06F 16/2365* (2019.01); *H04L 9/085* (2013.01); *H04L 9/0825* (2013.01); *H04L 9/0869* (2013.01); *H04L 9/3242* (2013.01)

(58) Field of Classification Search
CPC ... G06F 7/588; G06F 16/2365; H04L 9/0825; H04L 9/085; H04L 9/0869; H04L 9/3242; H04L 2209/08; H04L 9/0866
See application file for complete search history.

(56) References Cited

U.S. PATENT DOCUMENTS

| | | | | |
|---|---|---|---|---|
| 11,061,517 | B2* | 7/2021 | Matsuda | G06F 3/04186 |
| 2004/0133862 | A1* | 7/2004 | Naruta | G06F 30/367 703/14 |
| 2009/0316897 | A1* | 12/2009 | Kambayashi | H04L 9/0897 380/255 |
| 2011/0319092 | A1* | 12/2011 | Kim | H04B 7/024 455/452.1 |
| 2012/0005165 | A1* | 1/2012 | Tsai | H04L 67/104 707/813 |
| 2012/0155561 | A1* | 6/2012 | Seo | H04B 7/15542 455/269 |
| 2012/0314567 | A1* | 12/2012 | Seo | H04W 24/04 370/228 |
| 2013/0173751 | A1* | 7/2013 | Zachos | H04L 12/2825 709/219 |
| 2016/0103695 | A1* | 4/2016 | Udupi | H04L 47/78 718/1 |
| 2017/0215201 | A1* | 7/2017 | Kim | H04L 5/005 |
| 2020/0258157 | A1* | 8/2020 | Law | G06Q 40/04 |

\* cited by examiner

*Primary Examiner* — Lisa C Lewis

(57) ABSTRACT

An example of the instant solution comprises at least one of receiving an encrypted data and an encryption key, generating a randomized matrix, dispersing the encrypted data based on the randomized matrix resulting in a fragmented encrypted data and dispersing the encryption key based on the randomized matrix and the fragmented encrypted data.

20 Claims, 9 Drawing Sheets

DATA SET INCLUDING A SECURE KEY

BACKGROUND

Data protection has relied on network perimeter defense, end point protection and cryptographic solutions which have been unsuccessful in protecting data from internal and external actors that wish to improperly access and exploit data content.

SUMMARY

Example embodiments of the present application provide a method comprising at least one of receiving an encrypted data and an encryption key, generating a randomized matrix, dispersing the encrypted data based on the randomized matrix resulting in a fragmented encrypted data and dispersing the encryption key based on the randomized matrix and the fragmented encrypted data.

Another example embodiment of the present application provides a method comprising at least one of receiving encrypted data and an encryption key, generating a randomized matrix, dispersing the encrypted data based on the randomized matrix to create fractured encrypted data, creating a dispersal key based on the fractured encrypted data, concatenating the fractured encrypted data with the dispersal key and an authentication code associated with the dispersal key, distributing the concatenated fractured encrypted data and creating a primer key that maps a location of the distributed concatenated fractured encrypted data.

A further example embodiment of the present application provides a non-transitory computer readable medium comprising instructions that, when read by a processor, cause the processor to perform at least one of receiving an encrypted data and an encryption key, generating a randomized matrix, dispersing the encrypted data based on the randomized matrix resulting in a fragmented encrypted data and dispersing the encryption key based on the randomized matrix and the fragmented encrypted data.

Yet another example embodiment of the present application provides a non-transitory computer readable medium comprising instructions that, when read by a processor, cause the processor to perform at least one of receiving encrypted data and an encryption key, generating a randomized matrix, dispersing the encrypted data based on the randomized matrix to create fractured encrypted data, creating a dispersal key based on the fractured encrypted data, concatenating the fractured encrypted data with the dispersal key and an authentication code associated with the dispersal key, distributing the concatenated fractured encrypted data and creating a primer key that maps a location of the distributed concatenated fractured encrypted data.

Another example embodiment of the present application provides a system, comprising at least one memory and at least one processor configured to perform at least one of receive an encrypted data and an encryption key, generate a randomized matrix, disperse the encrypted data based on the randomized matrix resulting in a fragmented encrypted data and disperse the encryption key based on the randomized matrix and the fragmented encrypted data.

DETAILED DESCRIPTION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

The instant application provides, in one embodiment, disassociating enterprise and network administrators from authorization to data content while preserving access to systems that host and process data content. As such, users who created the data and individuals, whom the creator wished to share the data content, are able to resolve and assemble protected content that has been encrypted, fragmented and/or distributed. Therefore, unauthorized exfiltration and exploitation of data content can occur.

Figure 1:
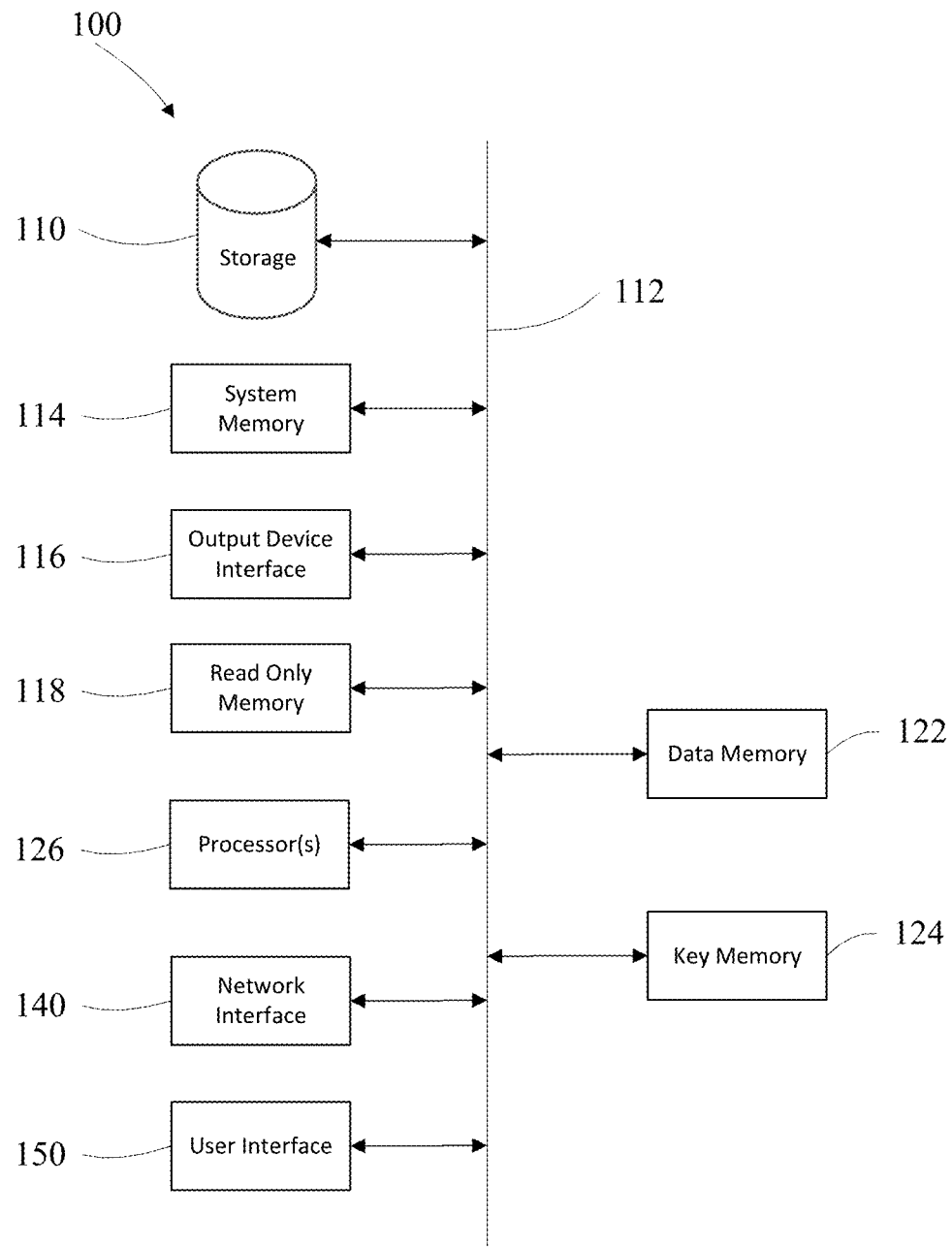
FIG. 1 illustrates a system layout according to example embodiments.

FIG. 1 depicts an example electronic system for use in connection with a secured system. Electronic system 100 may be a computing device for execution of software associated with the operation of one or more portions or steps of process 200, 400, 600, 700, 800 and 900, or components and processes provided by FIGS. 2, 4, 6, 7, 8 and 9. Electronic system 100 may be an embedded computer, personal computer or a mobile device such as a tablet computer, laptop, smart phone, personal digital assistant (PDA), or other touch screen or television with one or more processors embedded therein or coupled thereto, or any other sort of computer-related electronic device having wireless connectivity.

Electronic system 100 may include various types of computer readable media and interfaces for various other types of computer readable media. In the depicted example, electronic system 100 includes a bus 112, processor(s) 126, a system memory 114, a Read-Only Memory (ROM) 118, a permanent storage device 110, an user interface 150 and one or more network interfaces 140. The system also includes data memory 122, and key memory 124. In some implementations, electronic system 100 may include or be integrated with other computing devices or circuitry for operation of the various components and processes previously described.

Bus 112 collectively represents the system, peripheral, and chipset buses that communicatively connect the numerous internal devices of electronic system 100. For instance, bus 112 communicatively connects processor(s) 126 with ROM 118, system memory 114, permanent storage device 110 and the output device interface 116.

From these various memory units, processor(s) 126 retrieves instructions to execute and data to process in order to execute the processes of the subject disclosure. The processing unit(s) can be a single processor or a multi-core processor in different implementations.

ROM 118 stores static data and instructions that are used by processor(s) 126 and other modules of the electronic system. Permanent storage device 110 is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. Unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 126 retrieves instructions to execute and data to process in order to execute the processes of some implementations.

Bus 112 also connects to user interface 150 and output device interface 116, respectively. User interface 150 enables the user to communicate information and select commands to the electronic system. Input devices used with user interface 150 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as input and output devices.

Finally, as shown in FIG. 1, bus 112 also couples electronic system 100 to a network (not shown) through network interfaces 140. Network interfaces 140 may include, for example, a wireless access point (e.g., Bluetooth or Wi-Fi) or radio circuitry for connecting to a wireless access point. Network interfaces 140 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any component of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from one another and interact through a communication network. The relationship of client and server arises by virtue of computer programs running on the respective computers and having a client-server relationship to one another. Data generated at the client device (e.g., a result of the user interaction) can be received from the client device at the server.

Figure 2:
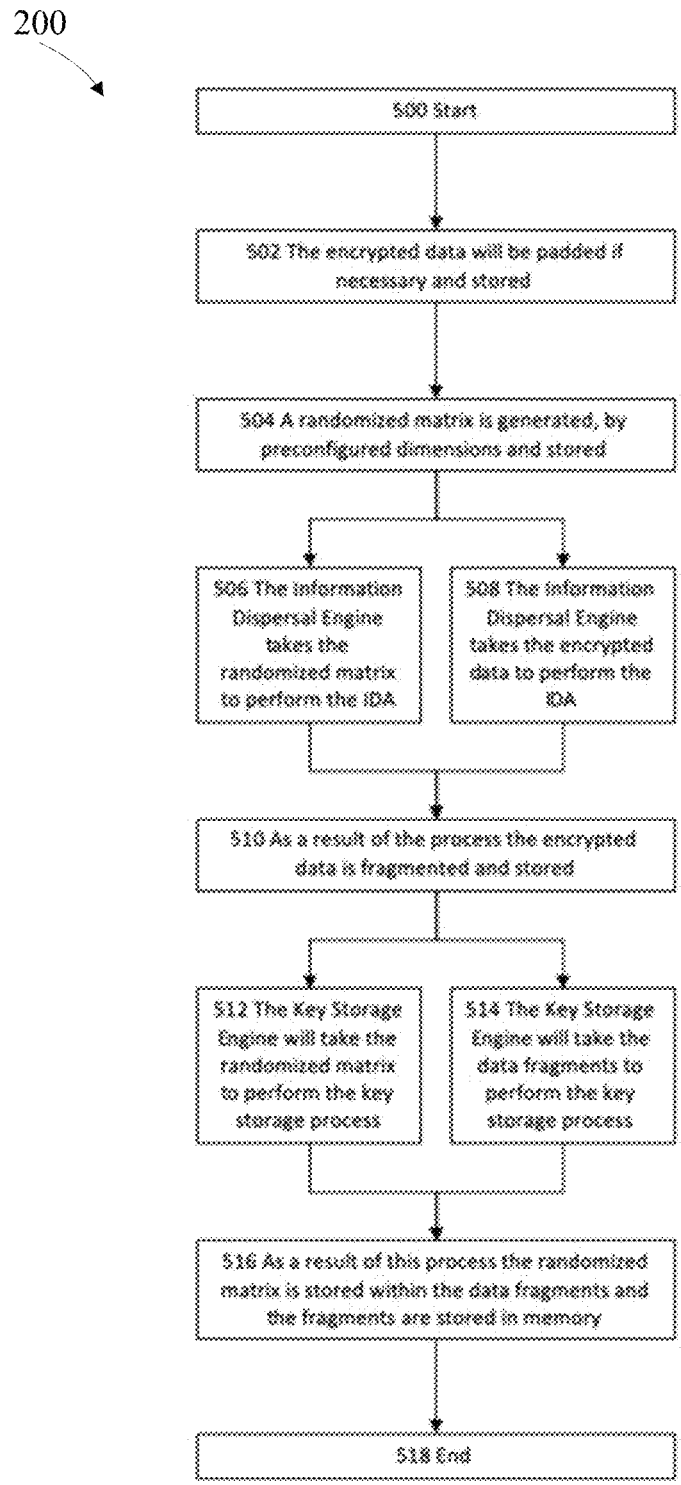
FIG. 2 illustrates a data fragmentation workflow of data shredding according to example embodiments.

FIG. 2 depicts an example data fragmentation workflow of data shredding 200. The process starts 500 with the padding 502 of the encrypted data if necessary and the storage of the padded encrypted data. A randomized matrix is generated 504 having preconfigured dimensions and the randomized matrix is stored. The dispersal is based on the input 506 of the randomized matrix and the input 508 of the encrypted data. The dispersal results in the fragmentation 510 of the encrypted data which is then stored. The key storage is based on the use 512 of the randomized matrix and the use 514 of the fragmented encrypted data. The dispersal results in the fragmentation 516 of the randomized matrix within the data fragments and the result is stored in memory.

Figure 3:
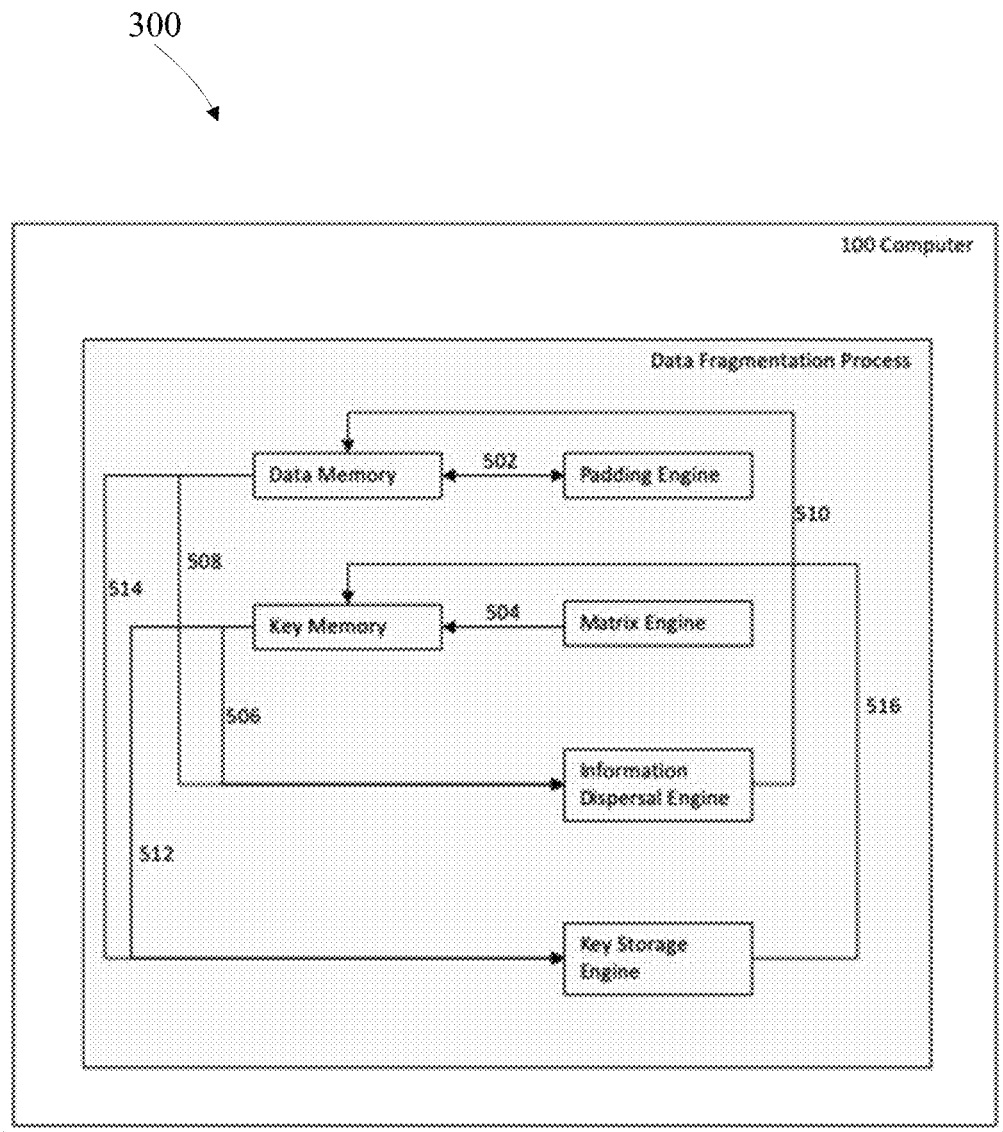
FIG. 3 illustrates a data fragmentation diagram according to example embodiments.

FIG. 3 depicts an example data fragmentation diagram 300. Within the computer 100 the data fragmentation process is performed. The padding 502 of the encrypted data is performed by the padding engine and the result is stored in data memory. A randomized matrix is generated 504 by the matrix engine and the randomized matrix is stored in key memory. The dispersal is based on the input 506 of the randomized matrix and the input 508 of the encrypted data to the information dispersal engine. The dispersal results in the fragmentation 510 of the encrypted data which is then stored in the data memory. The key storage is based on the use 512 of the randomized matrix and storage within the key storage engine. The key storage is also based on the use 514 of the fragmented encrypted data and storage within the key storage engine. The dispersal results in the fragmentation 516 of the key fragments utilizing the randomized matrix within the data fragments and the result stored in the key memory.

Before a user is able to use the data protection process, a profile policy is required to be defined. This profile policy includes a share count and threshold along with other information. To begin, a user chooses data to protect. This data can be a Word document, image, video, etc. Once data is selected, the system will initiate the data protection process prescribed by the data protection profile policy. The system will start by encrypting the data utilizing a cryptographic algorithm, such as ECDH 3072, Salsa20, AES 256, etc. The encryption process it will produce a key along with the encrypted data. For the Data Fragmentation process, the encrypted data will be padded if necessary. Then a randomized matrix is generated by preconfigured dimensions. The Information Dispersal Engine takes the randomized matrix along with the encrypted data to perform the IDA. As a result of the process the encrypted data is fragmented. The Key Storage Engine will take the randomized matrix along with the data fragments to perform the key storage process. As a result of this process the randomized matrix is stored within the data fragments and the fragments are stored in memory.

Figure 4:
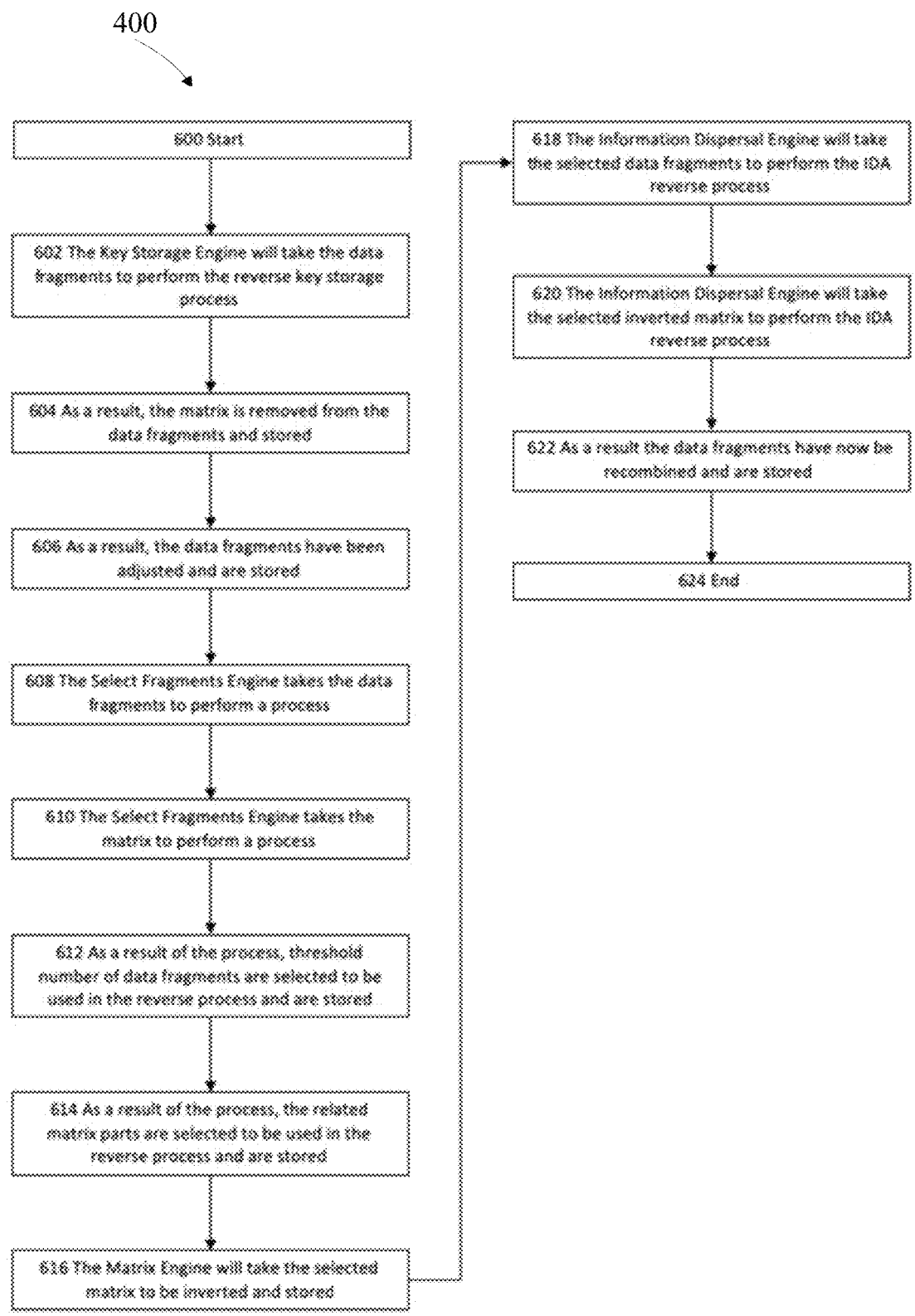
FIG. 4 illustrates a data fragmentation reverse workflow according to example embodiments.

FIG. 4 depicts an example data fragmentation reverse workflow 400. The process begins 600 with the key storage engine utilizing 602 the data fragments to reassemble the key. The matrix is removed 604 from the data fragments and stored. The data fragments are adjusted 606 and stored after the matrix removal. The select fragments engine selects 608 a portion of the data fragments based on 610 the randomized matrix. A threshold number of data fragments are selected 612 to be used in the reverse process and the results are stored. A portion of the randomized matrix is selected 614 to be used in the reverse process and the results are stored. The randomized matrix is inverted 616 by the matrix engine and stored. The selected data fragments are utilized 618 to perform the reverse of the dispersal. The selected inverted matrix is utilized 620 to perform the reversal of the dispersal. The data fragments are recombined 622 and stored before the process is completed.

Figure 5:
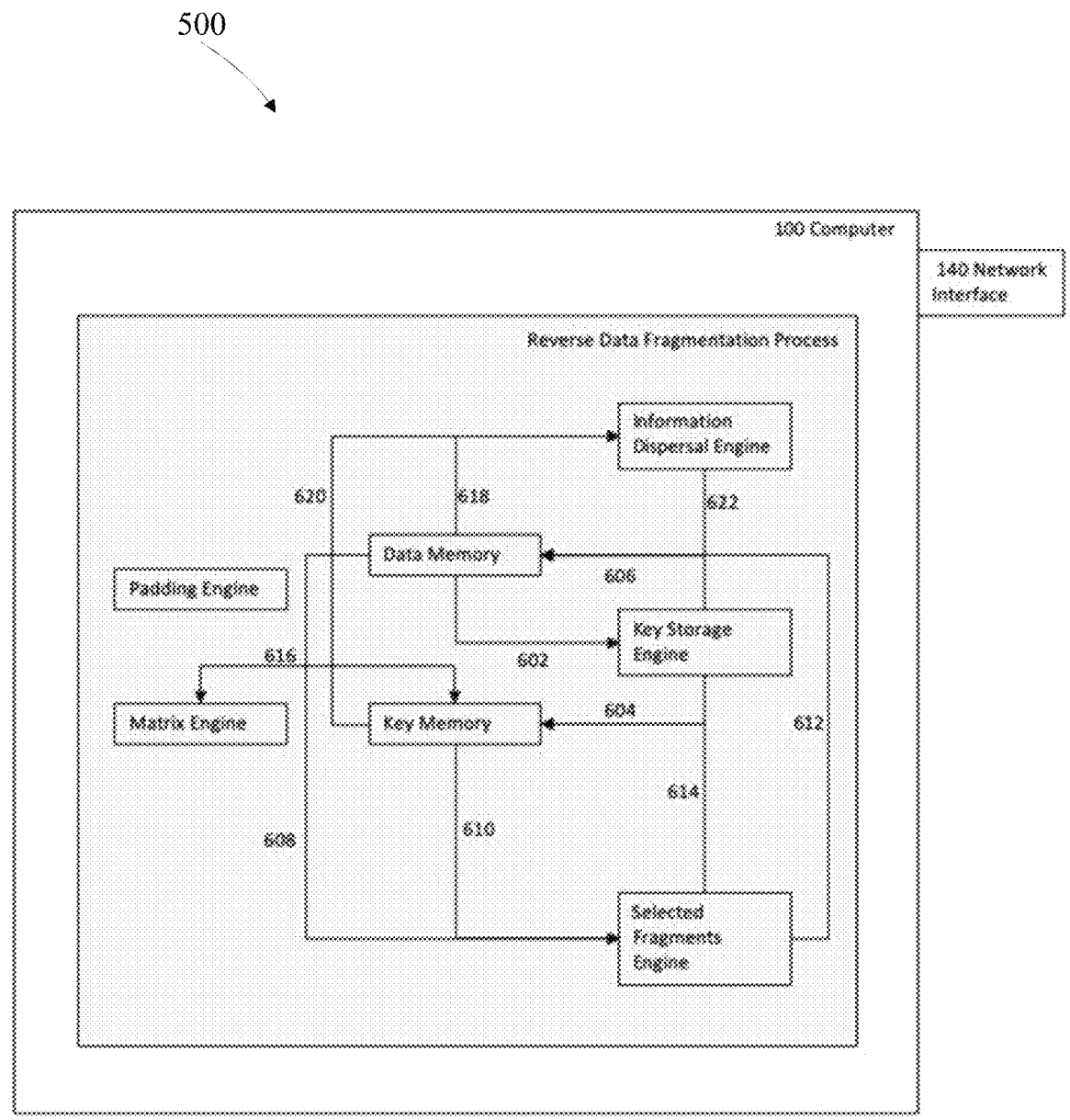
FIG. 5 illustrates a data fragmentation reverse diagram according to example embodiments.

FIG. 5 depicts an example data fragmentation reverse diagram 500. The reverse data fragmentation process is performed by the computer 100 connected to a network interface 140. The key storage engine utilizes 602 the data fragments sent from the data memory to the key storage engine to reassemble the key. The matrix is removed 604 from the data fragments and stored in the key memory. A threshold number of data fragments are selected 612 by the selected fragments engine to be used in the reverse process. The data fragments are adjusted 606 and stored after the matrix removal in data memory. The select fragments engine selects 608 a portion of the data fragments of the randomized matrix from the data memory to be sent to the selected fragments engine 610. A portion of the randomized matrix is selected 614 by the selected fragments engine to be used in the reverse process and the results are sent to the key storage engine. The randomized matrix is inverted 616 by the matrix engine and stored in the key memory. The selected data fragments are pulled from the data memory to be utilized 618 to perform the reverse of the dispersal by the information dispersal engine. The selected inverted matrix is pulled from the key memory to be utilized 620 to perform the reversal of the dispersal by the information dispersal engine. The data fragments are recombined 622 by the information dispersal engine and stored by the key storage engine before the process is completed.

To reverse the fragmentation of the data, the Key Storage Engine will take the data fragments to perform the reverse key storage process. As a result, the matrix is removed from the data fragments and the data fragments have been adjusted. The Select Fragments Engine takes the data fragments and the matrix to perform a process. As a result of the process a threshold number of data fragments are randomly selected to be used in the reverse process. In addition to the selected data fragments, the related matrix parts are also selected to be used. Then the Matrix Engine will take the selected matrix to be inverted. After the matrix is inverted the Information Dispersal Engine will take the inverted matrix along with the selected data fragments in order to perform the IDA reverse process. As a result of the process the data fragments have now be recombined and are stored.

Figure 6:
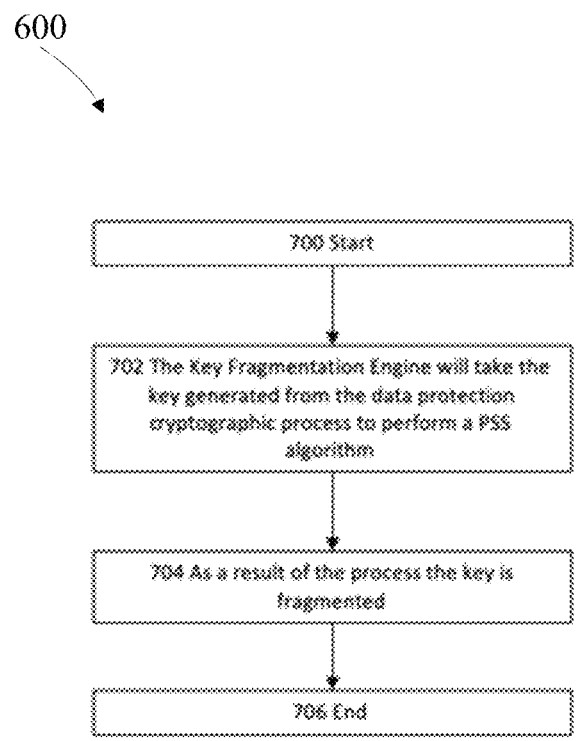
FIG. 6 illustrates a key fragmentation process flow of according to example embodiments.

FIG. 6 depicts an example key fragmentation process flow 600. The key fragmentation engine generates 702 a key from the data encryption engine, and results in key fragmentation 704.

Figure 7:
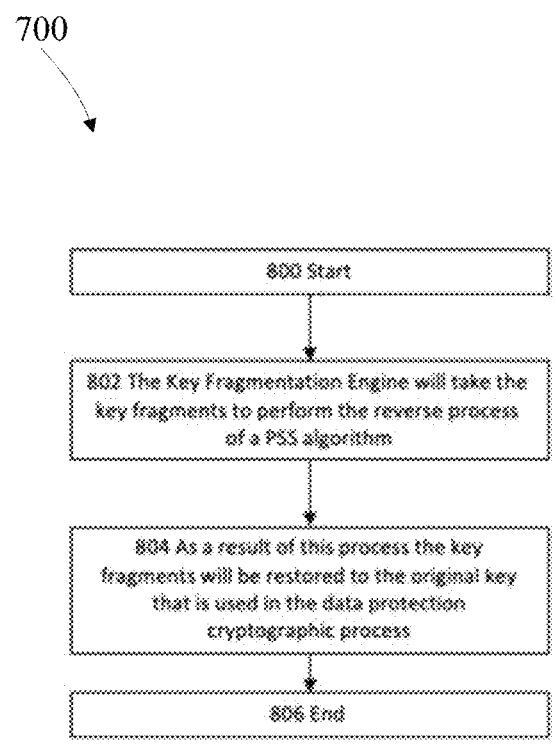
FIG. 7 illustrates a reverse key fragmentation process flow of according to example embodiments.

FIG. 7 depicts an example reverse key fragmentation process flow 700. The key fragmentation engine performs a reverse encryption 802 of the key fragments. The results of the encryption process are restored 804 to the original key.

A tombstone file is a synthetic file produced by the system and is the replacement for the actual file that would have been written should this process not have been invoked. The synthetic file is a representation to the user and the operating system reflecting what the original file would have consisted of with respect to size, type, header information, and thumbnail image. These files allow the system to interoperate with the user just as they would with a non-synthetic file. This file contains the header information of the original file a list of applications that have previously interacted with the original data, an obstructed key of shred locations and user information. In another example, the header file may additionally contain user rights and permission information.

Content files are associated with the content creator by binding the data's primer key for the encryption and shredding process to the users having successful authenticated to the system. A successful authentication will allow the system to release a key that initiate the process of locating content shreds. This primer key will not release the content from an encrypted state.

The system will allow for the distribution of content shreds both on persistent storage as well as network-based storage. This includes but is not limited to network mapped shares, network addressable storage devices, public and private cloud storage, and file hosting services. This may be configured by the user or by policy. This information is encoded into the tombstone file for content shred retrieval.

For endpoint systems the user that creates a file initially is the only individual that has access to the content in a cleared state. A network or an enterprise administrator does not have access to the content in a cleared state. The user may be either an individual, operator of the operating system or may be a member of a group, whereby only those members of a group with inherited privilege may access the file from a cleared content perspective. In another example, one or more files may be shared with other individual operators or groups. This method allows for the creator of the content to share the data in a continually protected (shredded and encrypted) state by persisting the data shreds in storage, while at rest and while in transit.

The following method allows a subset or portion of the content shreds by made minimally available to the system in order for the minimum number of persistent storage locations available may be utilized to reconstruct one hundred percent of the original content. This is achieved by computing the required overlap of data within the shreds. This process should be considered an industry standard method consistent with traditional RAID systems except this system is applying those methods at the file level instead of a data volume present on a hardware storage device.

Before a user is able to use the data protection process, a profile policy is required to be defined. This profile policy includes a share count and threshold along with other information. To begin, a user chooses data to protect. This data can be a Word document, image, video, etc. Once data is selected, the system will initiate the data protection process prescribed by the data protection profile policy. The system will start by encrypting the data utilizing a cryptographic algorithm, such as ECDH 3072, Salsa20, AES 256, etc. The encryption process will produce a randomly generated key along with the encrypted data. By default, the RNG begins creating random numbers using the host Operating System's CSRNG. Support is included for seeding the RNG with, for example, a True Random Number data source. In doing so, the RNG would thereafter create True Random numbers when creating both Initialization Vectors used in AES and matrices used for cryptographic bit-splitting. In another example, data and key shredding invokes platform-specific features for vectorization of the PSS and IDA, enabling multiple chunks of data to be separated simultaneously. For the Data Fragmentation process, the encrypted data will be padded if necessary. Then a randomized matrix is generated by preconfigured dimensions. The Information Dispersal Engine takes the randomized matrix along with the encrypted data to perform the IDA. As a result of the process the encrypted data is fragmented. The Key Storage Engine will take the randomized matrix along with the data fragments to perform the key storage process. The Key Storage process uses the keys that were generated from the IDA and the data shreds to benefit from the obfuscation that results from co-mingling the two. This is accomplished by combining two sets of x shreds, A (encrypted data shreds) and B (IDA keys), into a single set of x shreds, C, such that each C shred contains parts of A and parts of B. This technique uses a PSS algorithm to create (n−1) shreds per IDA key. While shredding data and keys, integrity data is incorporated in data and key shreds in the form of an authentication code, such as HMAC. The HMAC algorithm takes each PSS key shred along with the associated IDA data shred as input. The final shreds will each contain the original IDA data shred along with (n−1) different HMAC codes and adjacent to each HMAC code is the associated PSS key shred. As a result of the Data Fragmentation process the data has been fragmented and the keys used to create the data fragments have been fragmented and inserted into the data fragments. Now, the Key Fragmentation process fragments the encryption key using a PSS algorithm. The key fragments can then be concatenated to the data fragments before the system writes the data fragments to both the logical and geographic locations that were prescribed by the user directly or by policy.

In order to take the currently protected data and get it back into the original and unprotected state, the following is done. To start, the encryption key is recombined using the reverse PSS. Next the recovered data shreds are used to perform the recombination process of the data fragmentation. The first step of the process is done by the Key Storage Engine. The Key Storage Engine will take the data fragments to perform the reverse key storage process. This process starts by separating the PSS shreds and the HMAC codes. The HMAC codes are used to verify the integrity of the data, rendering fragments invalid when integrity is unable to be validated. Then the verified PSS shreds are used to perform the reverse PSS. As a result of the reverse key storage process the PSS shreds have been recombined to form the IDA keys and the encrypted data fragments have been adjusted. The Select Fragments Engine takes the data fragments and the IDA keys to perform a selection process. As a result of the process a threshold number of data fragments are randomly selected to be used in the recombination process of the data fragments. In addition to the selected data fragments, the related IDA keys are used to form a matrix. Then the Matrix Engine will take the selected matrix to be inverted. After the matrix is inverted the Information Dispersal Engine will take the inverted matrix along with the selected data fragments in order to perform the IDA reverse process. As a result of the process the data fragments have now been recombined. The final step is for the Encryption Engine to take the recombined encrypted data to decrypt it. The Encryption Engine takes the encrypted data along with the recombined encryption key to perform the decryption process of the data utilizing the preconfigured cryptographic algorithm. As a result, the data has now been restored to its original state.

These system and methods allow a user or group of users to create and utilize data content without the traditional vulnerabilities associated with network and enterprise administration. This system allows only those with direct ability to disassemble and decrypt data content that was explicitly created or shared with them to render, view or process the data content. The advantage of this system and method allows for the benefit of organizations to share data content for collaboration more easily while simultaneously mitigating the traditional vulnerabilities to data of network and enterprise infrastructure.

Figure 8:
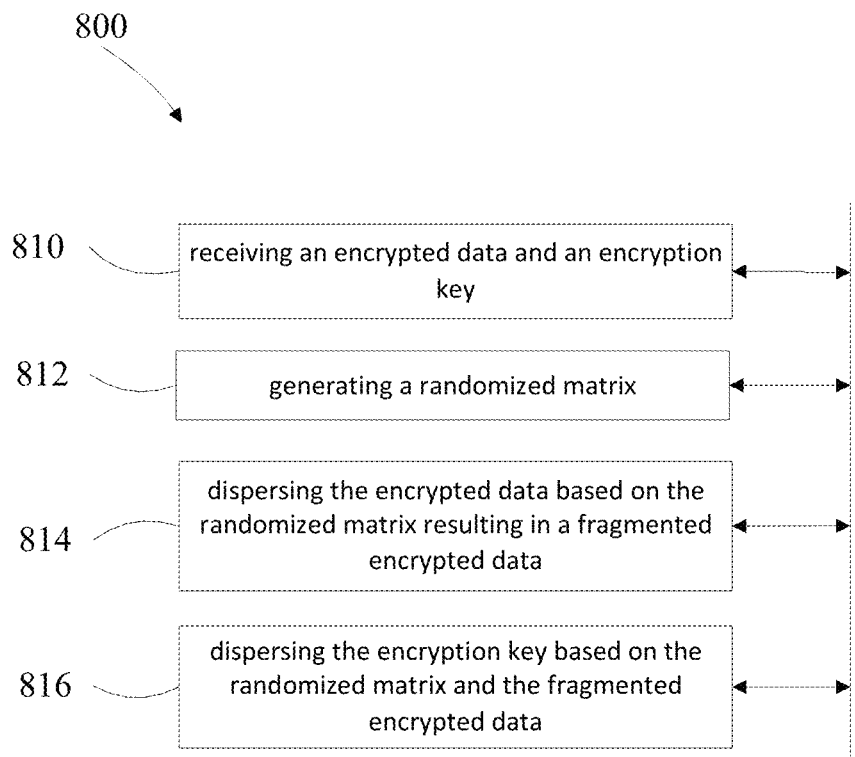
FIG. 8 illustrates an eighth example flow diagram of data shredding according to example embodiments.

FIG. 8 depicts a method comprising, receiving 810 an encrypted data and an encryption key, generating 812 a randomized matrix, dispersing 814 the encrypted data based on the randomized matrix resulting in a fragmented encrypted data and dispersing 816 the encryption key based on the randomized matrix and the fragmented encrypted data.

The method of FIG. 8 may further include, inverting the randomized matrix, selecting a threshold number of encrypted data fragments and related randomized matrix portions and accumulating the fragmented encrypted data based on the inverted randomized matrix.

Figure 9:
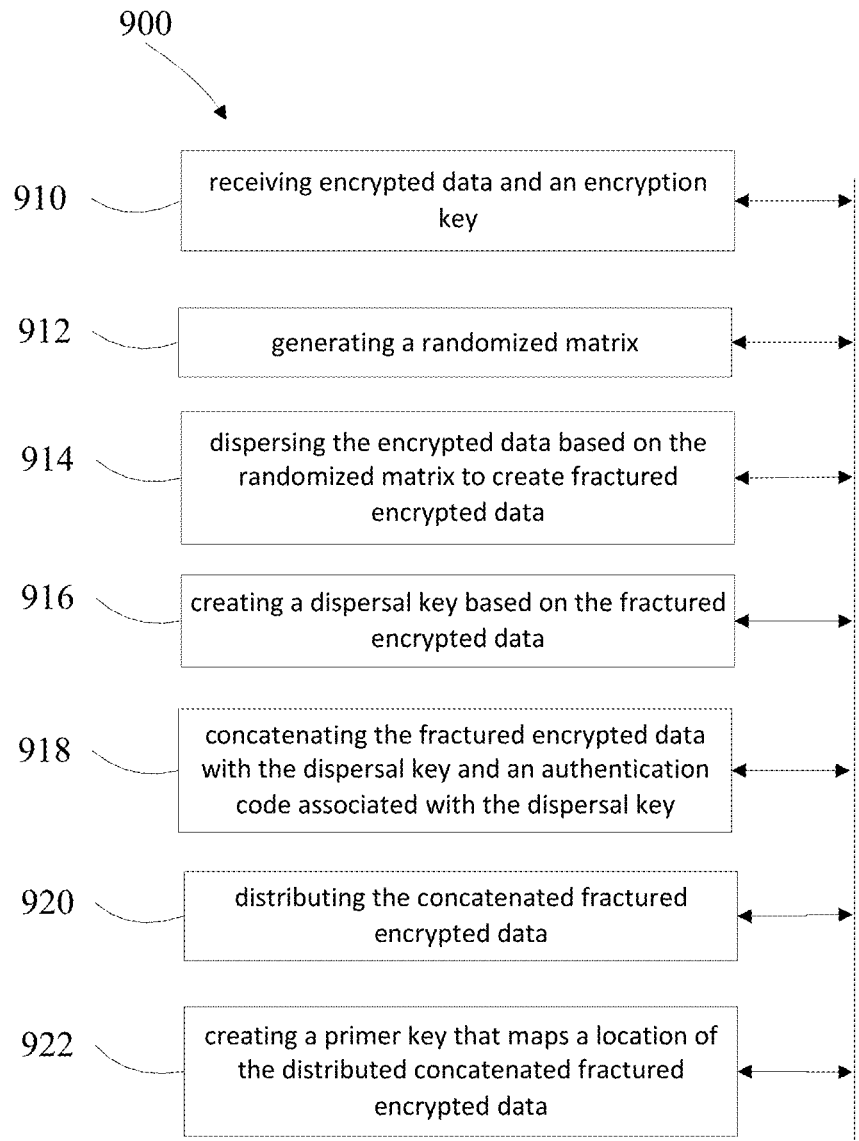
FIG. 9 illustrates a ninth example flow diagram of reverse data shredding according to example embodiments.

FIG. 9 depicts a method comprising, receiving 910 encrypted data and an encryption key, generating 912 a randomized matrix, dispersing 914 the encrypted data based on the randomized matrix to create fractured encrypted data and creating 916 a dispersal key based on the fractured encrypted data. The method also includes concatenating 918 the fractured encrypted data with the dispersal key and an authentication code associated with the dispersal key, distributing 920 the concatenated fractured encrypted data and creating 922 a primer key that maps a location of the distributed concatenated fractured encrypted data.

The method of FIG. 9 may further include, recollecting the concatenated fractured encrypted data based on the primer key, separating the dispersal key and the authentication code from the fractured encrypted data, recombining the fractured encrypted data based on the separated dispersal key, inverting the randomized matrix, reconstructing the encrypted data based on the fractured encrypted data and the inverted randomized matrix and decrypting the encrypted data based on the encryption key.

The methods of FIGS. 8 and 9 may also be utilized in computer readable methods and utilized by computer processors in systems.

Default Software Setup

Once the software is installed on the device, the setup process will launch. This process will optionally guide the user through the following setup processes: File Management, Storage Management, Network Management, Device Management, Access Management and a Review Setup process. A person skilled in the art will ensure that default items are well defined for the device and operating system combination being setup. If the user chooses to accept the default installation, the following set of configuration items are accepted, but are not limited to:

File Management—This process the working directory, which is the location where the application will perform intermediate work when encrypting, decrypting and shredding files.

Storage Management—This process the File storage RAID is default to RAID 1. Meaning, the file is encrypted not split into parts with redundancy applied. In short, an exact copy of the file is made, encrypted and stored. No RAID is applied to the Keystore, File Database (FileDB), or Configuration File when default conditions are accepted. In order for RAID 1 to be accomplished, a person skilled in the art will set and create two different default locations for the files to be stored on the local device.

The setup software will then proceed to process where the software will interact with the graphics chip to display the web page, summarizing the user's selections and presenting the user with the option to test the setup. A person skilled in the art will show the selections in editable form, allowing for changes to be made if the user decides. A successful test will be displayed to the user and user confirmed exit. If the test fails, the software flow, as in process diagram 2.0, will allow the choice of returning back to the test page or starting over with setup process.

Non-Default Software Setup

In this case, the user chooses not to accept the default setup. A person skilled in the art, having created a web-based application using well known procedures and using well known protocols, interacting with the graphics chip will walk the user through the setup process. The application will guide the user through the following processes:

File Management—The web page will capture the user's decisions for the Working Directory and the Clean Wipe settings. Working directories have already been described above.

Clean Wipe—a yes/no toggle—instructs the application to remove any residual intermediate data that can be recovered by forensic processes or applications. This applies to disk use and memory use. A person skilled in the art, will employ known techniques to scrub magnetic drives and zero out memory, specific to the device type in use by the user, by effectively writing over the data to make it effectively useless. When the process is complete, the application will wipe the memory (process 8.1), log events, exit File Management Setup and proceed to Storage Management.

Storage Management—The web page will capture the RAID decisions for the following files: File, Keystore, FileDB and Configuration. Once set, the user's configuration file is updated as seen in process. The user interface will then guide the setup of the storage locations as depicted in process. Optionally allowing the following types of locations to be defined but are not limited to: local storage process, removable storage process, network storage process and cloud storage process. For the storage types defined, Check N Counter, process is called to optionally adjust the RAID settings or add the new storage in support of the storage already allocated. Optionally set the encryption scheme, allow the user to assign the storage and store the setting changes to the configuration files. Upon exit, the system continues with the storage location setup. A person skilled in the art using the web interface in conjunction with the graphics chip will capture the relevant information for the storage type.

Create Cloud Locations—This process captures the cloud name, type, Universal Resource Location (URL) and user credentials. The process validates connection to the new storage location and updates the N counter in process then updates the configuration file and proceeds to the next storage location setup or exits.

Create Local Locations—This process follows the same basic process as Create Cloud Locations. A person skilled in the art of working with the user interface, graphics engine and web programming will capture the name of the local storage locations, the path to the local storage location and optionally create the storage location that is specific to the device type. The N Counter process and the user configuration file are updated then proceeds to the next storage location or exits.

Create Removable Locations—This process involves doing the same process as Create Local Locations but involves working with removable media storage. In short, any device that can be connected to a device—a location for storing data—then removed, then reconnected to the and have its data retrieved. Examples include, but are not limited to: Secure Digital (SD) cards, USB connected thumb drives, Universal Serial Bus (USB) connected hard drives, read/write CD/DVD/BR, optical disk, tape drives and printer file storage.

Create Network Locations—This process involves working with Network storage devices. Examples include network attached storage (NAS), disk arrays, local area network (LAN), virtual private networks (VPNs). One difference from removable locations is that the network locations are attached to the device via a network where there is usually some form of controlled access but are not actively managed by vendors such as those defined in cloud locations. The same process applies here but with the addition option of capturing user network credentials.

Network Connectivity to Storage

This connection is a physical connection from the storage devices to the network infrastructure. This may be a Transmission Control Protocol/Internet Protocol (TCP/IP), Fiber or direct Ethernet connection.

Physical Storage Devices—In computer storage, a logical unit number (LUN) is a number used to identify a logical unit, which is a device addressed by the Small Computer System Interface (SCSI) protocol or similar protocols such as Fiber Channel or iSCSI. A LUN may be used with any device which supports read/write operations, such as a tape drive, but is most often used to refer to a logical disk as created on a Storage Area Network (SAN).

Cloud Storage—Cloud storage is a service model in which data is maintained, managed and backed up remotely and made available to users over a network.

If not successful, the application will give the user the option to try again. If successful, the application will use the arithmetic logic unit (ALU) and memory to decrypt and recombine the shreds of the FileDB and Keystore.

Keystore

Keystores utilize mutual authentication. Mutual authentication, also called two-way authentication, is a process or technology in which entities in a communications link authenticate one another. In a network environment, the client authenticates the server and vice-versa. In this way, network users can be assured that they are doing business with legitimate entities and servers can be certain that would-be users are attempting to gain access for legitimate purposes.

The graphics engine will then be used to render the display of the available file and share information stored by the application in the user defined locations.

Once the system is viewable, user activities are available via the application menu, such as Upload A File, Download A File, Share A File, File Open and File Delete.

ALU

An arithmetic-logic unit (ALU) is the part of a computer processor (CPU) that carries out arithmetic and logic operations on the operands in computer instruction words. In some processors, the ALU is divided into two units, an arithmetic unit (AU) and a logic unit (LU). Some processors contain more than one AU—for example, one for fixed-point operations and another for floating-point operations. (In personal computers, floating-point operations are sometimes done by a floating-point unit on a separate chip called a numeric coprocessor.)

The ALU may have direct input and output access to the processor controller, main memory Random Access Memory (RAM) in a personal computer), and input/output devices. Inputs and outputs flow along an electronic path that is called a bus. The input comprises an instruction word, sometimes called a machine instruction word that contains an operation code, one or more operands, and sometimes a format code. The operation code tells the ALU what operation to perform and the operands are used in the operation. The format may be combined with the op code and tells, for example, whether this is a fixed-point or a floating-point instruction. The output comprises a result that is placed in a storage register and settings that indicate whether the operation was performed successfully.

Example encryption types can be seen in the Storage Location setup. Once the shred is encrypted, the application begins the upload data process. To upload a shred, a person skilled in the art will utilize well-known network protocols, transport mechanisms and defined interfaces with 3rd Party Cloud providers to connect to the defined storage locations. If enough shred data can be copied into the storage locations and then subsequently put back together, any shreds not uploaded will be held for upload at a later time. If the application is unable to upload enough shreds to reconstitute the file, an error is returned to the user and the application presents a choice to cancel the operation or continue at a later date when connection can be established. If the upload is successful, the application will notify the user of the successful upload, update the File DB and return the menu selection for further action by the user after logging the event.

To download a file, which places a copy of the file on the user system. The system state is effectively presenting the menu list. In this case, the menu item chosen by the user is "Download", following the same process as described above with the exception that the core file information is already present in the system's File DB. Such information as, the file name, alias, m:n, size, checksum, storage locations and encryption type. In this case, the selected file is presented to the download process. The software, as written by a person skilled in the art, will accept the input FileDB information into the download file process, connect to the data storage locations, using well known protocols for Cloud, Removable, Network and Local, and return enough shreds to begin reconstruction of the file. If not enough locations can be connected to download for reconstruction, the software will offer to try again. If accepted, the download will begin again. If not accepted the software will log the results, notify the user and exit. Once the download is complete, the software will decrypt the shreds by removing the zombie data based on the settings passed in. If not successful, the software will present the option to try again. If selected, the decryption process will try again and if not, the software will log the event and exit the process. If decryption was successful, the shreds will be appended together to reform the file and will be placed into the working directory. If successful, the application will use the graphics chip and the web Application Programming Interface (API) component to repopulate the user interface with the newly downloaded and decrypted file. If unsuccessful, the application will optionally retry appending the shreds or will restart the process of decrypting the selected file shreds. If the application is directed to exit, the user activities such as uploading a file, Download a File, Open a File, Delete a File and Share a File are available via the application menu.

M:N

M of N is associated with redundancy; redundancy is a system design in which a component is duplicated so if it fails there will be a backup.

In order to share a file with another device, the device is pre-registered. The API passes the name and path of the file to be shared. If the file needs to be uploaded the process that is described above will be followed. Once successful, a person skilled in the art will retrieve the contact list of devices from the Contact List Data storage. The user will select from the list of devices to share the file with. The list displays the identity associated the device. Examples include but are not limited to, name and device type being shared. If the file is already uploaded—determined by the location passed in—the file will be downloaded via the same process, decrypted into the working directory, re-encrypted with the shared key associated with the registered device and uploaded by the process defined above. If the file is not yet uploaded, the shared encryption key will be passed into the Upload a File which will perform the calls to shred, encrypt and upload the shared file. Once the upload is complete, a person skilled in the art will update Relying Party Trust storage with information such as, Configuration File, File Access, Time to Live (TTL), Expiration, FileDB, File Name, Alias, Check Sum, Size, Encrypted File Name, etc.

Information Dispersal Algorithm

An Information Dispersal Algorithm (IDA) is a scheme intended for the distribution of a piece of information among n active processors, in such a way that the recovery of the information is possible in the presence of m active processors (i.e. out of m fragments), where m and n are parameters satisfying $1 \leq m \leq n$.

Hash-Based Message Authentication Code (HMAC)

In cryptography, an HMAC is a specific type of message authentication code (MAC) involving a cryptographic hash function and a secret cryptographic key. It may be used to simultaneously verify the data integrity and the authentication of a message, as with any MAC. Any cryptographic hash function, such as Secure Hash Algorithm (SHA)-256 or SHA-3, may be used in the calculation of an HMAC; the resulting MAC algorithm is termed HMAC-X, where X is the hash function used, e.g. HMAC-SHA256 or HMAC-SHA3. The cryptographic strength of the HMAC depends upon the cryptographic strength of the underlying hash function, the size of its hash output, and the size and quality of the key.

HMAC uses two passes of hash computation. The secret key is first used to derive two keys—inner and outer. The first pass of the algorithm produces an internal hash derived from the message and the inner key. The second pass produces the final HMAC code derived from the inner hash result and the outer key. Thus the algorithm provides better immunity against length extension attacks.

An iterative hash function breaks up a message into blocks of a fixed size and iterates over them with a compression function. For example, SHA-256 operates on 512-bit blocks. The size of the output of HMAC is the same as that of the underlying hash function (e.g., 256 and 1600 bits in the case of SHA-256 and SHA-3, respectively), and may be truncated.

HMAC does not encrypt the message. The message (encrypted or not) is sent alongside the HMAC hash. Parties with the secret key will hash the message again themselves, and if it is authentic, the received and computed hashes will match.

Information Theoretic Security

Information theoretic security is a cryptosystem whose security derives purely from information theory; the system cannot be broken even if the adversary has unlimited computing power. The cryptosystem is considered crypt-analytically unbreakable if the adversary does not have enough information to break the encryption.

An encryption protocol with information theoretic security does not depend for its effectiveness on unproven assumptions about computational hardness. Such a protocol is not vulnerable to future developments in computer power such as quantum computing. An example of an information theoretically secure cryptosystem is the one-time pad. The concept of information theoretically secure communication was introduced in 1949 by American mathematician Claude Shannon, the inventor of information theory, who used it to prove that the one-time pad system was secure. Information theoretically secure cryptosystems have been used for the most sensitive governmental communications, such as diplomatic cables and high-level military communications, because of the great efforts enemy governments expend toward breaking them.

Perfect security is a specific case. For an encryption algorithm, if there is ciphertext produced that uses it, no information about the plaintext is provided without knowledge of the key. If E is a perfectly secure encryption function, for any fixed message m, there is, for ciphertext c, at least one key k such that $c=E\_k (m)$. It has been proved that any cipher with the perfect secrecy property use keys with effectively the same requirements as one-time pad keys.

It is common for a cryptosystem to leak some information and still maintain its security properties even against an adversary that has unlimited computational resources. Such a cryptosystem would have information theoretic but not perfect security. The exact definition of security would depend on the cryptosystem in question.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. The executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference may be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
receiving an encrypted data and an encryption key; generating a randomized matrix;
dispersing the encrypted data based on the randomized matrix resulting in a fragmented encrypted data; and
dispersing the encryption key based on the randomized matrix and the fragmented encrypted data.

2. The method of claim 1, comprising dispersing the encrypted data based on the randomized matrix to create fractured encrypted data.

3. The method of claim 2, comprising creating a dispersal key based on the fractured encrypted data.

4. The method of claim 3, comprising concatenating the fractured encrypted data with the dispersal key.

5. The method of claim 4, comprising concatenating the fractured encrypted data and an authentication code associated with the dispersal key.

6. The method of claim 5, comprising distributing the concatenated fractured encrypted data.

7. The method of claim 6, comprising creating a primer key that maps a location of the distributed concatenated fractured encrypted data.

8. A system, comprising:
at least one memory; and
at least one processor configured to:
receive an encrypted data and an encryption key;
generate a randomized matrix;
disperse the encrypted data based on the randomized matrix that results in a fragmented encrypted data; and
disperse the encryption key based on the randomized matrix and the fragmented encrypted data.

9. The system of claim 8, wherein the processor is configured to disperse the encrypted data based on the randomized matrix to create fractured encrypted data.

10. The system of claim 9, wherein the processor is configured to create a dispersal key based on the fractured encrypted data.

11. The system of claim 10, wherein the processor is configured to concatenate the fractured encrypted data with the dispersal key.

12. The system of claim 11, wherein the processor is configured to concatenate the fractured encrypted data and an authentication code associated with the dispersal key.

13. The system of claim 12, wherein the processor is configured to distribute the concatenated fractured encrypted data.

14. The system of claim 13, wherein the processor is configured to create a primer key that maps a location of the distributed concatenated fractured encrypted data.

15. A non-transitory computer readable medium comprising
instructions, that when read by a processor, cause the processor to perform:
receiving an encrypted data and an encryption key;
generating a randomized matrix;
dispersing the encrypted data based on the randomized matrix resulting in a fragmented encrypted data; and
dispersing the encryption key based on the randomized matrix and the fragmented encrypted data.

16. The non-transitory computer readable medium of claim 15 comprising instructions, that when read by a processor, cause the processor to perform dispersing the encrypted data based on the randomized matrix to create fractured encrypted data.

17. The non-transitory computer readable medium of claim 16 comprising instructions, that when read by a processor, cause the processor to perform creating a dispersal key based on the fractured encrypted data.

18. The non-transitory computer readable medium of claim 17 comprising instructions, that when read by a processor, cause the processor to perform concatenating the fractured encrypted data with the dispersal key and an authentication code associated with the dispersal key.

19. The non-transitory computer readable medium of claim 18 comprising instructions, that when read by a processor, cause the processor to perform distributing the concatenated fractured encrypted data.

20. The non-transitory computer readable medium of claim 19 comprising instructions, that when read by a processor, cause the processor to perform creating a primer key that maps a location of the distributed concatenated fractured encrypted data.

\* \* \* \* \*